Jan. 13, 1953   E. A. MALLETT ET AL   2,625,639
SEAM WELDER HEAD
Filed Nov. 8, 1950
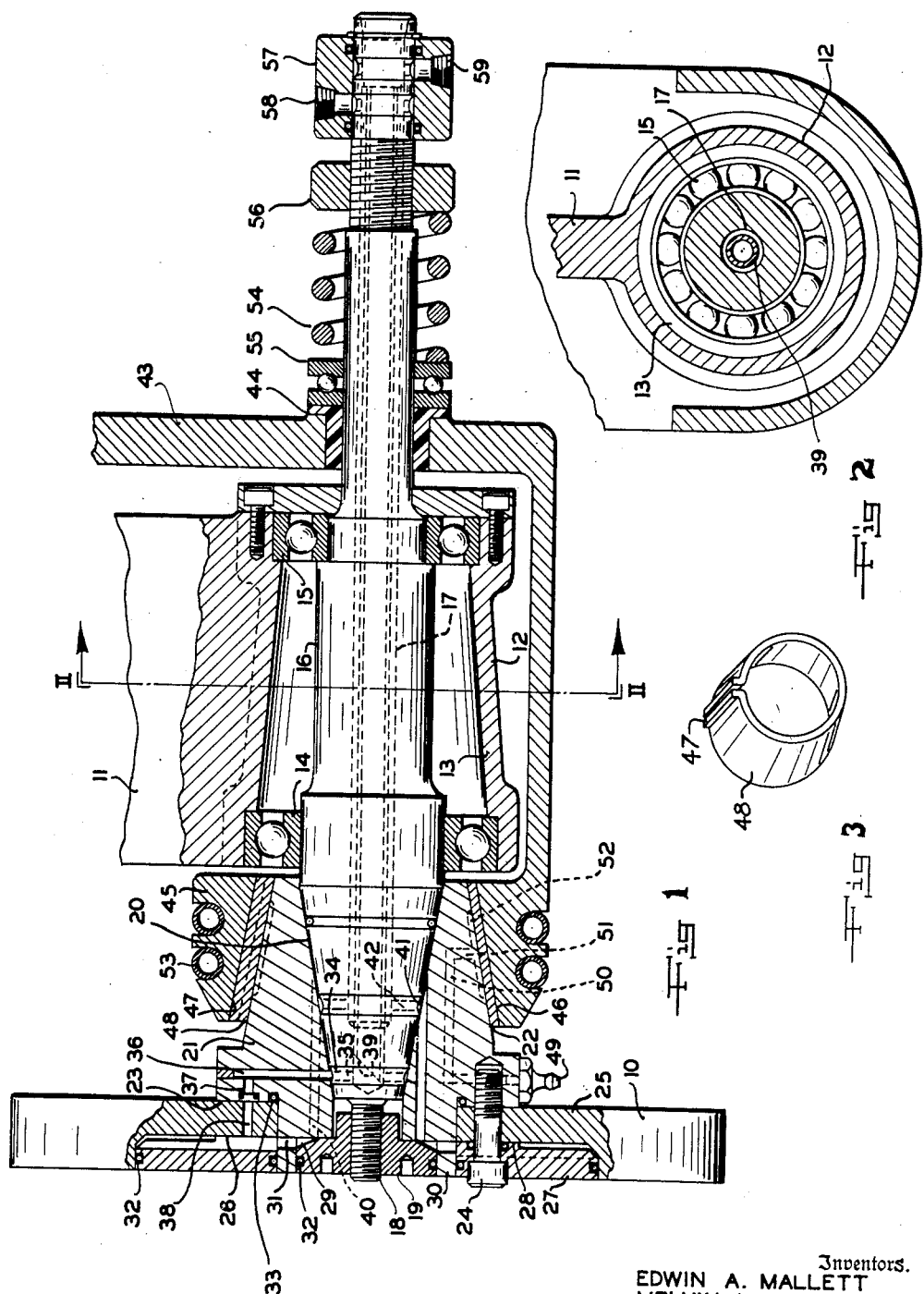
Inventors.
EDWIN A. MALLETT
MELVIN M. SEELOFF
By Francis J. Klempay
Attorney Patented Jan. 13, 1953

2,625,639

UNITED STATES PATENT OFFICE 2,625,639

SEAM WELDER HEAD

Edwin A. Mallett and Melvin M. Seeloff, Warren, Ohio, assignors to The Taylor-Winfield Corporation, Warren, Ohio, a corporation of Ohio Application November 8, 1950, Serial No. 194,682

10 Claims. (Cl. 219—4)

1

This invention relates to electric resistance welding apparatus and more particularly to an improved arrangement for rotatably supporting and conducting welding current to a rotary welding electrode as used in seam welders, for example. As is known in the electric resistance welding art, the conduction of the heavy welding currents required to the welding electrode of the welding machine is a serious problem in the case of rotary electrodes, particularly if large losses in the system are to be avoided. Heretofore, either cumbersome and expensive arrangements such as large laminated brushes or the expedient of conducting the welding current directly through the journal for the rotatable electrode have been utilized for this purpose, with the latter method preferable due to its simplicity and ability to be integrated into practical machines of trim design. However, the conductivity requirements preclude the use of wear resistant materials and effective lubrication in the journal so that in almost all presently constructed electric resistance seam welders wear in the journals of the rotary or wheel electrodes is very rapid and either the shaft or the bearing must be adjusted and replaced at very frequent intervals. For reasons of economy the shafts are usually made of softer material than the bearings so that only the electrode-carrying shafts need normally be replaced but even this part is quite costly due to the high copper content of the alloy employed in its manufacture.

A further disadvantage of the current conductive journal now commonly employed in electric resistance seam welders is the change in the electrical characteristics of the welding current circuit due to wear of the bearing and to changes in the welding pressure applied, which force, of course, must be transmitted through the journal or bearing. Also, the welding force applied and resisted by the journal is often much higher than the contact pressure required for efficient conduction of welding current across the relatively sliding surfaces of the journal so that as regards electrical requirements much higher pressures with the resultant much higher rate of wear is effected than is theoretically required.

Journals and shafts of low electrical resistance and of sufficient cross-sectional areas to efficiently transmit the very high amperages required in electric resistance welding are necessarily quite bulky and heretofore this necessity has seriously interfered with the machine designer's task of arranging for minimum electrical losses (magnetic) and maximum physical work clearance in

2 the throat of the machine. The present invention, in addition to providing increased longevity and lower electrical and mechanical losses in the rotatable support of a wheel type of electric resistance welding electrode, also provides for minimum projection of current conductive members into the welding throat of the machine so that electrical inductive losses are minimized while a larger physical dimension is allowed for manipulation of the work. Another object of the invention is the provision in a seam welding head for an electric resistance welding machine of an improved adjustable and relatively rotatable contact pad mounted in close proximity to the welding wheel whereby electrical losses and heating are minimized, whereby the contact bushing is very easily replaceable if and when required, and whereby the mechanical supporting apparatus is entirely separate from the electrical conducting circuit to enable both to operate with maximum efficiency.

The above and other objects and advantages of the invention will become apparent upon consideration of the following detailed specification and the accompanying drawing wherein there is disclosed a preferred embodiment of the invention.

In the drawing:

Figure 1 is a longitudinal vertical section of an electric resistance seam welder head constructed in accordance with the principles of our invention;

Figure 2 is a transverse section through the apparatus of Figure 1 taken along the line II—II of Figure 1; and Figure 3 is a perspective view of the tapered contact bushing shown in Figure 1.

In the drawing, reference numeral 10 designates generally a wheel type of electrode which in the normal use of the complete welding machine, not shown, with which the apparatus of this invention will be associated, will have rolling contact with the work, also not shown, and in doing so will effect a continuous weld along the work. For the rotatable support of the electrode 10 in an upper head installation of which the embodiment herein is representative, we provide a depending support 11 which is rounded at its lower end as shown at 12 and which is longitudinally bored at its lower end portion as shown at 13. The support 11 will, in normal application, be rigidly attached to a vertically movable slide or quill of the welding machine whereby the wheel 10 may be raised or lowered and welding pressure applied thereto. Member 11 is of substantial longitudinal length and journaled in the bore 13 by means of the anti-friction bearings 14 and 15 is the shaft 16 which is provided with a shouldered bore 17 extending from the outer or free end of the shaft to almost the other end thereof. Said other end of said shaft is formed with an integral nib 18 of reduced diameter onto which is threaded a collar 19, the function of which will be described below.

Shaft 16 is tapered as shown at 20 to receive a correspondingly tapered bore of the electrode wheel mounting hub 21 and the inner portion of the outer peripheral surface of the hub 21 is reversely tapered as shown at 22 while the forward end portion of the outer periphery of the hub 21 is recessed as shown at 23.

Fitting snugly within the recess 23 of the hub 21 and rigidly secured thereto by a plurality of circumferentially spaced cap screws 24 is the radially inward portion of the electrode wheel 25, the outer face of which is recessed as shown at 26 to provide a passage for a cooling fluid whereby the electrode may be maintained at an efficient operating temperature even under conditions of continuous use. It should be observed that the recess 26 is closed off by means of an annular plate 27, the inner face of which is spaced from the inner face of the recess 26 by bosses 28 through which the cap screws 24 extend. Thus, the cap screws also clamp the cover plate 27 in position in addition to clamping the electrode wheel 25 onto the hub 21. It should also be observed that the collar 19 is shouldered to engage a portion of the outer end wall of the hub 21 so that the latter may be rigidly clamped onto the taper 20 of the shaft 17 and that the inner face of the collar 19 is bevelled at 29 to provide a radially inward passage for the cooling fluid contained in the space 26.

Concentrically intermediate the cover ring 27 and the collar 19 is an annular boss 30 which is integral with the hub 21 and which is provided with a plurality of circumferentially spaced apertures 31 which provides communication between the space 26 and the wedge-shaped annular space bounded on one side by the bevel 29 of the collar 19. The outer periphery of the collar 19 and both the inner and outer peripheries of the cover ring 27 are grooved to receive the resilient O-ring gaskets 32 which prevent leakage of the cooling fluid out of the face of the welding wheel assembly. A similar gasket 33 is positioned at the inner corner of the wheel 25 so as to prevent leakage of fluid from the inner face of the wheel.

The tapered portion 20 of shaft 16 is formed with an annular groove 34 which by means of a plurality of circumferentially spaced apertures 35 communicates with the inner end of the shouldered bore 17 formed in shaft 16. Transversely aligned with the groove 34 is a multiplicity of circumferentially spaced radial and longitudinal passages 36 and 37, respectively, formed in the hub 21 and these discharge into apertures 38 formed in the wheel 25 whereby cooling fluid may be conducted into the wheel 25 through the hollow shaft 16. In accordance with usual practice a small centrally disposed fluid conducting tube 39 is positioned within the bore 17 with its inner end positioned within the inner reduced diameter portion of the bore as shown in Figure 1.

From the space 26 in the wheel 25 the cooling fluid passes radially inward through the apertures 31 into the longitudinally spaced passages 40 formed in the hub 21 and, as shown in Figure 1, the inner ends of these passages 40 terminate at the taper 20 where they are intercepted by an annular groove 41 formed in the tapered portion of the shaft 16. Groove 41 communicates through a plurality of circumferentially spaced apertures 42 with a bore 17 outwardly of the tube 39 whereby means is provided to circulate cooling fluid through the wheel and supporting shaft.

To conduct welding current to the wheel 25 we provide a cup-shaped member 43 which is of suitable copper alloy to provide a low resistance path and it should be observed that the journal end portion of the support 11 is telescopically received within the hollow of the member 43. One longitudinal end of member 43 is a plate-like structure having an aperture to receive shaft 16 and a surrounding flanged insulating bushing 44 and this plate-like structure may be formed with an integral extension, as shown, for attachment to the laminated flexible connector, not shown, of the welding machine assembly. The opposite longitudinal end of the member 43 is formed with an integral collar 45 having a tapered bore 46 complementary to the taper 22 of the hub 21. Positioned within the taper bore 46 is a split tapered bushing 48 which is made of silver to provide good electrical contact between the collar 45 and the hub 21. The free ends of the bushing 48 are bent radially outward, as shown in Figure 3, to form an integral key 47 which is adapted to engage a suitable keyway provided therefor in the collar 45 to thereby prevent rotation of the bushing. It should be understood, of course, that both the hub 21 and the wheel 25 are constructed of suitable copper alloy for efficient conduction of the heavy welding currents transmitted. The bushing 48 may be lubricated through fitting 49 and passages 50, 51 and 52 formed in the hub structure as will be understood. The outer periphery of the collar 45 is grooved to receive a few turns of a tube 53 which conducts cooling fluid in close proximity to and in good heat exchange relation with the current conductive bushing interstice so that this bushing may be always maintained at an efficient operating temperature.

To provide a controlled pressure loading on the conductor bushing 48 sufficient for maximum current conduction but for minimum wear we provide means in the form of a compression coil spring 54 to yieldingly urge the collar 45 and thus the split bushing 48 onto the tapered bearing surface of the hub 21. For this purpose, the spring 54 is interposed between an anti-friction thrust bearing 55 which lodges against the bushing 44 and an adjustable nut 56 which is threaded onto the shaft 16. By adjustment of the nut 56 the pressure loading on the bushing 48 can be varied as desired and it should be particularly noted that this loading is entirely independent of the welding force applied through the wheel 25 since such welding force is transmitted entirely through the wheel 25, the hub 21, shaft 16, bearings 14 and 15 and the machine support 11 whereas the current conductive member 43 and the collar 45 are in effect a floating assembly which rides on the bushing 48. The bushing 44, however, accurately maintains alignment of the bushing 48 and the hub 21 so that uniform pressure contact is obtained throughout the whole of the bearing area of the bushing 48 to give maximum current transmission with minimum density whereby heating losses will be kept to a minimum. It is inherent in the nature of the tapered bushing that full area contact will be maintained under all conditions of wear so long as alignment is maintained. Also, the presently described bearing loading arrangement automatically compensates for wear in the bushing since the member 43, 45 simply shifts to the left, as viewed in Figure 1, as the bushing wears down. The replacing of the bushing, if and when required, is a simple operation requiring only the removal of the collar 19 which is facilitated by the spanner recesses formed in its outer face. This allows the hub 21 to be withdrawn from the shaft 16 thereby exposing the bushing 48.

Rotatably mounted on the rear end of the shaft 16 outwardly of the nut 56 is a fitting 57 having an inlet port 59 and an outlet port 58 whereby cooling fluid may be conducted into the tube 39 and outwardly of the bore 17. Such fittings are conventional in welding machines and accordingly will not be described in detail here.

In operation the welding wheel 25 may be driven either by a power applied to the shaft 16 but more preferable is the arrangement wherein a driven friction roller is applied to the outer periphery of the wheel 25 as shown in U. S. Patent No. 1,822,371, for example.

It should now be apparent that we have provided an improved arrangement for journaling and conducting welding current to a rotary resistance welding electrode which is highly advantageous in that the electrode is precision mounted and rotatable with minimum driving force even when loaded for the application of heavy welding pressure, in that current conduction to the electrode is highly efficient with minimum heating losses and wholly independent of the welding force applied, in that the assembly is compact and simple in design with a minimum of bulky insulation, and in that the adjustment, maintenance and repair of the rotary welding head are substantially simplified. Of particular advantage is the fact that the radial dimension of the journal and current conducting may be kept quite small so that the assembly of the invention may be integrated into various complete welding machines providing maximum work clearance. Electrical losses are further reduced by placing the contact bushing quite close to the welding wheel itself.

The above specifically described embodiment of our invention should be taken as illustrative only as obviously many changes may be made therein without departing from the spirit or scope of the invention. Reference should therefore be had to the appended claims in determining the scope of the invention.

Having thus described our invention what we claim is:

1. In apparatus for rotatably supporting and conducting welding current to a rotary resistance welding electrode the combination of a projecting support having a longitudinal bore therein adjacent its free end, a shaft anti-frictionally journaled in said bore and having a tapered outer end portion, a hub of current-conductive material mounted on said tapered outer end portion and adapted to mount said rotary welding electrode, said hub having a tapering outer surface, a current conductive member having a pocket fitting over and about said free end of said support and having an integral collar portion encircling the outer taper of said hub at one end of said bore and an integral wall portion at the other end of said bore, said current conductive member being movable relative to said support, said shaft extending rearwardly through said wall, means on said shaft outwardly of said wall to urge said shaft in one longitudinal direction while urging said member and collar in the opposite longitudinal direction, said collar having an inner taper complementary to the outer taper of said hub, the arrangement of the parts being such that said collar is tightened onto the outer taper of said hub by action of said urging means.

2. Apparatus according to claim 1 further including a tapering split bushing of current conductive material interposed between the outer taper of said shaft and the inner taper of said collar, said bushing having an integral key extending radially outward and adapted to engage a keyway provided therefor in said collar.

3. Apparatus according to claim 1 further including detachable means at the tapering end of said shaft to retain said hub and electrode on said shaft, the arrangement being such that upon removal of said hub and electrode from said shaft the taper in said collar is exposed for insertion of a bushing.

4. In apparatus for rotatably supporting and conducting welding current to a rotary resistance welding electrode the combination of a support, a shaft, bearing means for journaling said shaft on said support, said shaft having an end portion projecting outwardly of said support and bearing means, a current-conductive hub mounted on said projecting end portion of said shaft and adapted to mount said rotary electrode, said hub having a tapered outer portion, a current-conductive collar encircling said tapered outer portion and having an inner taper generally complementary to said tapered outer portion, means to conduct welding current to said collar, said collar being movable with respect to said support, and means to yieldingly urge said collar longitudinally of said shaft whereby said inner taper is held in pressure contact with the said tapered outer portion of said hub.

5. Apparatus according to claim 4 further including a tapered split bushing of current conductive material interposed between the outer taper of said shaft and the inner taper of said collar, said bushing having an integral key extending radially outward and adapted to engage a keyway provided therefor in said collar.

6. Apparatus according to claim 4 further including a fluid-conducting tube encircling the outer periphery of said collar and positioned in heat exchanging contact therewith whereby said collar may be cooled by the flow of a fluid cooling medium.

7. Apparatus according to claim 4 further including openings in said hub for the transmission of a fluid cooling medium through said hub and electrode and further including conduit means positioned in heat exchanging relation with said collar for the passage of a fluid cooling medium, the arrangement being such that the heat generated by the flow of welding current across the rotary connection between the collar and the hub is dissipated by the flow of fluid cooling mediums both from the hub and from the collar.

8. In apparatus for rotatably supporting and conducting welding current to a rotary resistance welding electrode the combination of a support, a shaft, bearing means for journaling said shaft on said support, said shaft extending outwardly of said bearing means in both longitudinal directions, a welding wheel assembly detachably mounted on one end of said shaft and having a tapered outer portion, a current conductive member fitting about said support and having one end portion apertured to receive the opposite projecting end of said shaft and having a ring-like opposite end portion inwardly tapered complementary to the outer tapered portion of said welding wheel assembly, said current conductive member being movable with respect to said support, and means mounted on said other projecting end of said shaft and outwardly of said current-conductive member to resiliently urge said current-conductive member longitudinally of said shaft to thereby apply pressure to the tapering surfaces of said assembly and said ring-like portion of said current conductive member.

9. In apparatus for rotatably supporting and conducting welding current to a rotary resistance welding electrode the combination of a support having a projecting free end, a shaft journaled in said free end of said support and projecting outwardly therefrom, a tapered current conductive hub mounted on the projecting end of said shaft and adapted to mount said rotary electrode, a ring-like conductor having a tapered contact surface in contact with an annular portion of said hub, and means to maintain said ring-like conductor in predetermined pressure engagement with said annular portion of said hub, the arrangement being such that said pressure is wholly independent of the welding force exerted by said rotary electrode through said shaft.

10. Apparatus according to claim 9 further including communicating passages in said shaft, hub and rotary electrode whereby said electrode may be cooled by the flow of fluid therethrough, and further including conduit means on said ring-like conductor whereby said conductor may be cooled by the flow of fluid in heat exchanging relation therewith to carry away the heat generated by the sliding contact between said hub and conductor.

EDWIN A. MALLETT.
MELVIN M. SEELOFF.

REFERENCES CITED

The following references are of record in the file of this patent:

UNITED STATES PATENTS

| Number | Name | Date |
|---|---|---|
| 2,006,835 | Kurtze | July 2, 1935 |
| 2,009,873 | Caputo | July 30, 1935 |
| 2,015,415 | Steiner | Sept. 24, 1935 |
| 2,179,802 | Sykes | Nov. 14, 1939 |